J. MADRY.
WASHBOILER.
APPLICATION FILED APR. 13, 1917.
1,234,920.
Patented July 31, 1917.
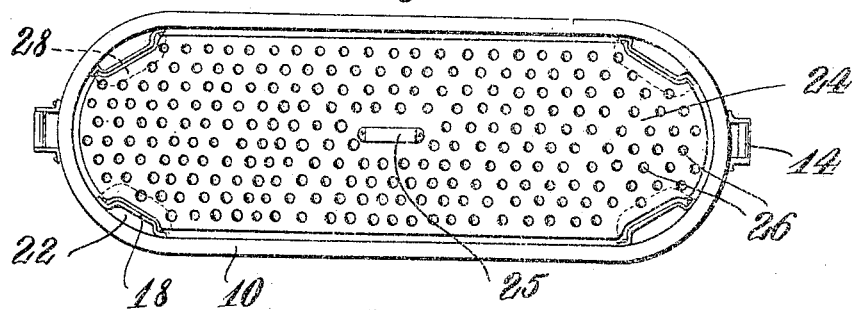
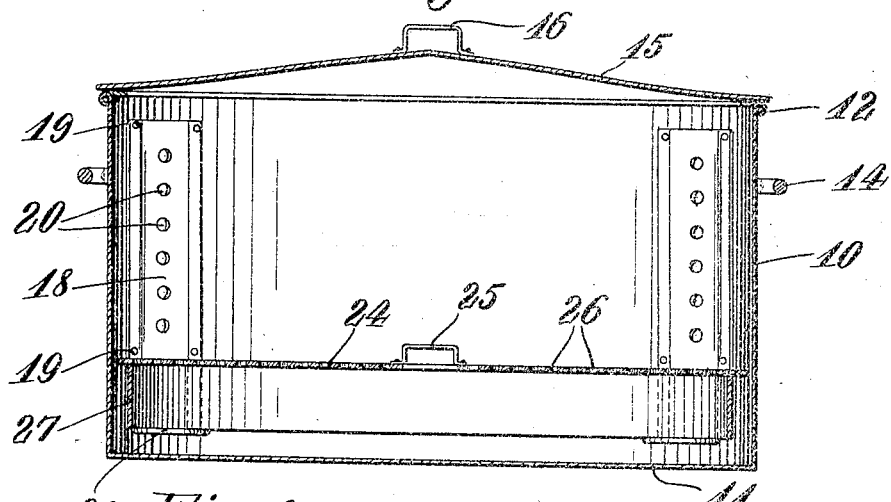
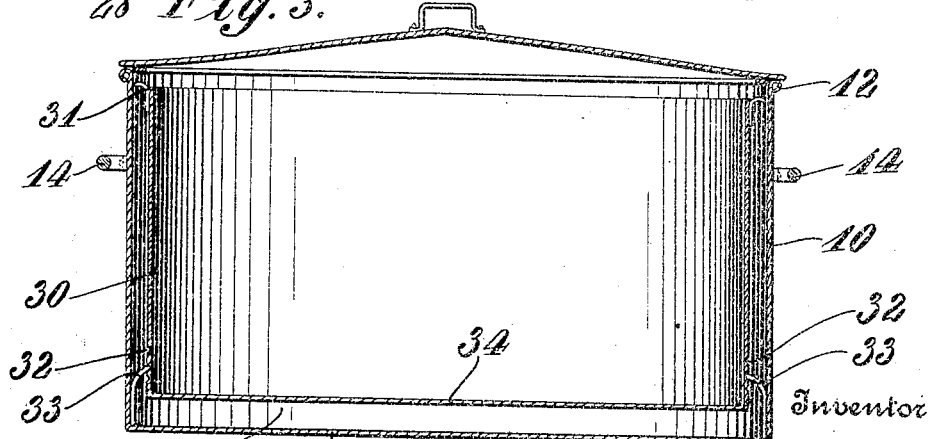
Inventor
John Madry.
By his Attorney
Oscar Geier

UNITED STATES PATENT OFFICE.

JOHN MADRY, OF DIXON, ILLINOIS.

WASHBOILER.

1,234,920.      Specification of Letters Patent.      Patented July 31, 1917.

Application filed April 13, 1917. Serial No. 161,701.

*To all whom it may concern:*

Be it known that I, JOHN MADRY, a subject of the Emperor of Austria-Hungary, resident of Dixon, county of Lee, and State of Illinois, have invented certain new and useful Improvements in Washboilers, of which the following is a specification.

This invention relates to improvements in boilers, particularly for household laundry purposes, and has as its principal object the provision of means whereby an inner vessel may be adjusted relatively to an outer casing, so as to contain a greater or lesser quantity of the articles to be boiled.

A further object is to provide means whereby the water is caused to circulate throughout the articles boiled thereby providing a very effective device for loosening dirt and like accumulations.

These and other like objects are attained by the novel design, construction and combination of parts hereafter described and shown in the accompanying drawing forming a material part of this disclosure, and in which:—

Figure 1 is a top plan view of a boiler made in accordance with the invention.

Fig. 2 is a vertical sectional view taken through the center line thereof, and

Fig. 3 is a similar vertical sectional view showing a modification in construction.

In the present invention the outer casing 10 is formed with an integral bottom 11, and provided at its upper edge with a beaded rim 12, the shape being generally of an elongated oval, handles 14 being secured at the ends by means of which the boiler may be manipulated.

A cover 15 of the usual form is provided having extending edges adapted to rest upon the beaded edge 12 of the outer vessel, the cover having a rigid handle 16 by which it may be raised or otherwise manipulated.

In Figs. 1 and 2, a plurality of out-turned plates 18 are secured preferably near the end of the outer container by means of rivets 19, the plates containing a plurality of perforations 20 through which water may pass as it rises through the space 22 formed between the wall of the plate and the interior of the container, so that as the hot water rises, it is passed out through the apertures 20 onto the articles disposed on the plate 24 provided with an operating handle 25, and having a plurality of perforations 26 formed therethrough, through which the water may circulate.

Formed with the plate 24 are downwardly extending elements 27 adapted to rest upon the flanges 28, formed with the plates 18, the same extending inward toward the center of the outer container.

Thus when soiled clothing and the like are to be boiled for the purpose of eradicating the dirt, the container is filled partially with water, which, when in a heated condition, will rise in the spaces 22 and pass out through the apertures 20, commingling with the clothing or articles disposed on the plate.

In the form shown in Fig. 3, an inner container 30, is provided at its upper edge with a plurality of outwardly curved projections 31, adapted to make contact with the interior walls of the casing 10, while near the end walls of the inner container 30 are a plurality of depressions 32, engageable with which are spring elements 33 secured at the ends of the casing in such manner that their free ends will engage within the depressions, holding the container at any desired height, forming a variable space between the bottom 34 of the container, and the wall 11 of the casing, the space therebetween being partially filled with water.

I claim:—

1. In a wash boiler, the combination with an oval casing, a cover therefor, and a handle by which it may be manipulated, of an inner vessel having an open top, outwardly extending springs secured to the top of said inner vessel adapted to contact with the interior of said casing, a plurality of spaced indentations formed in the end walls of said vessel, and a second series of springs secured within the end walls at the bottom of said casing and having a part engageable with the indentations formed in the walls of said inner vessel.

2. In a wash boiler, the combination with a hollow casing, of an interior vessel suited thereto, means for normally holding said interior vessel spacedly within the walls of said casing, the walls of said inner vessel having series of spaced indentations, and means secured within said casing selectively engageable with the mentioned indentations whereby said inner vessel may be held adjustable in height with relation to said casing.

In testimony whereof I have affixed my signature.

JOHN MADRY.

Copies of this patent may be obtained for five cents each, by addressing the "Commissioner of Patents, Washington, D. C."